United States Patent
Yoshida

(10) Patent No.: US 12,010,282 B2
(45) Date of Patent: Jun. 11, 2024

(54) IMAGE FORMING SYSTEM AND METHOD OF CONTROLLING IMAGE FORMING SYSTEM

(71) Applicant: CANON KABUSHIKI KAISHA, Tokyo (JP)

(72) Inventor: Masatoshi Yoshida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/204,435

(22) Filed: Jun. 1, 2023

(65) Prior Publication Data

US 2023/0396722 A1 Dec. 7, 2023

(30) Foreign Application Priority Data

Jun. 6, 2022 (JP) .................................. 2022-091825

(51) Int. Cl.
 *H04N 1/23* (2006.01)
 *G03G 15/00* (2006.01)
(52) U.S. Cl.
 CPC ....... *H04N 1/2323* (2013.01); *G03G 15/5029* (2013.01); *H04N 1/2376* (2013.01); *H04N 1/2392* (2013.01)
(58) Field of Classification Search
 CPC .. H04N 1/2323; H04N 1/2376; H04N 1/2392; G03G 15/5029
 See application file for complete search history.

(56) References Cited

U.S. PATENT DOCUMENTS

2015/0210494 A1\* 7/2015 Takata ..................... B65H 7/06
  358/1.15
2018/0107146 A1\* 4/2018 Shinohara .......... G03G 15/6552

FOREIGN PATENT DOCUMENTS

| JP | H05-138976 A | 6/1993 |
| JP | 2014-056043 A | 3/2014 |
| JP | 2019-138962 A | 8/2019 |
| JP | 2020-160188 A | 10/2020 |

OTHER PUBLICATIONS

English translation of JP2014056043 A (Year: 2014).\*
European Search Report dated Oct. 13, 2023, in related European Patent Application No. 23175661.0.

\* cited by examiner

*Primary Examiner* — Iriana Cruz
(74) *Attorney, Agent, or Firm* — VENABLE LLP

(57) ABSTRACT

An image forming system operable to perform image formation on a sheet includes a storage for storing a sheet, a conveyor configured to convey a sheet along a conveyance path a sheet size setter configured to set a size of the sheet stored in the storage, a sheet size detector configured to detect a size of the sheet conveyed by the conveyor, at least one memory that stores at least one program, and at least one processor. The at least one program causes the at least one processor to perform obtaining a difference between the size set by the sheet size setter and the size detected by the sheet size detector, and controlling image formation, wherein when the difference is greater than a first reference value, the processor interrupts image formation, and when the difference is less than or equal to the first reference value and greater than a second reference value, which is smaller than the first reference value, the processor notifies a warning without interrupting image formation.

15 Claims, 11 Drawing Sheets

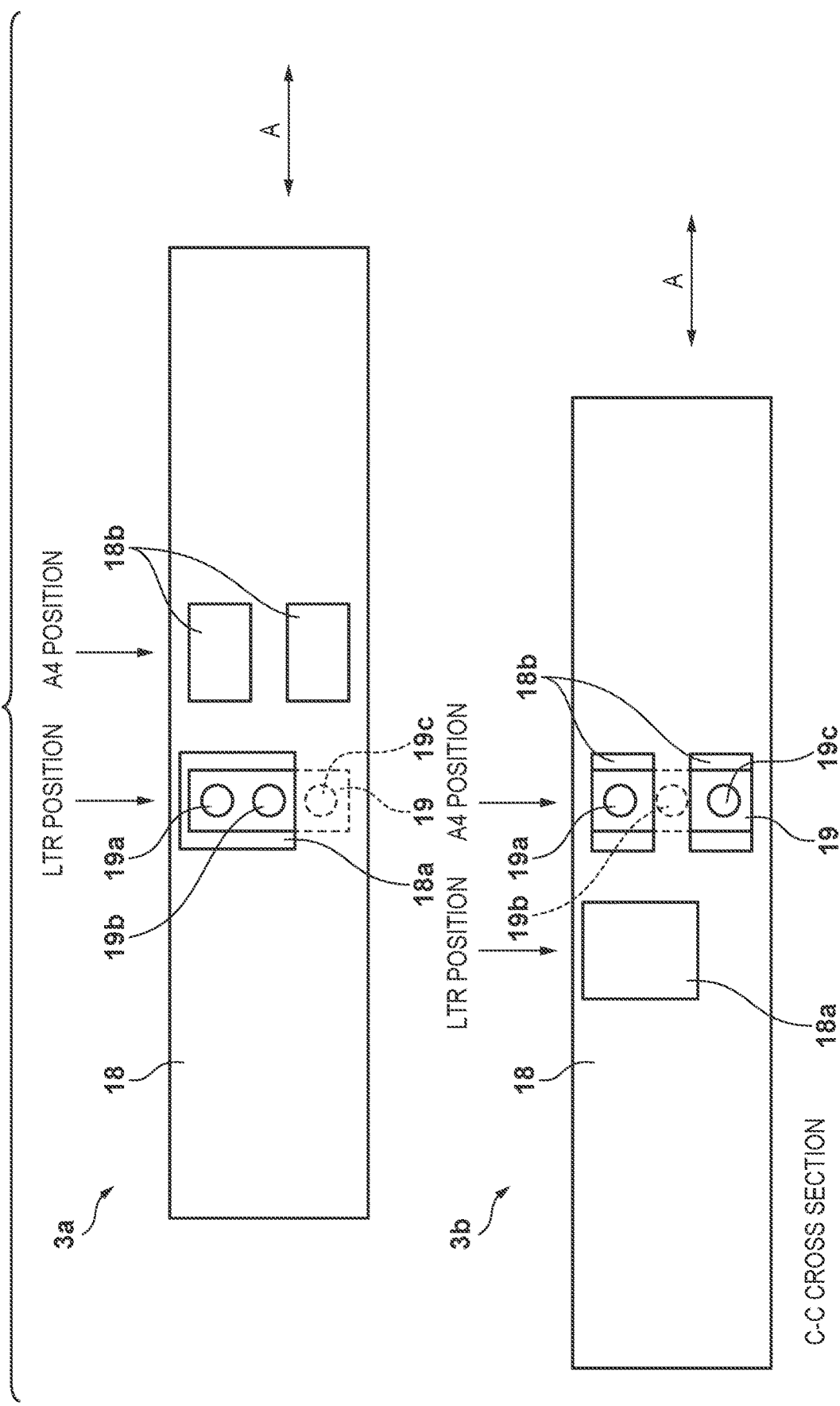

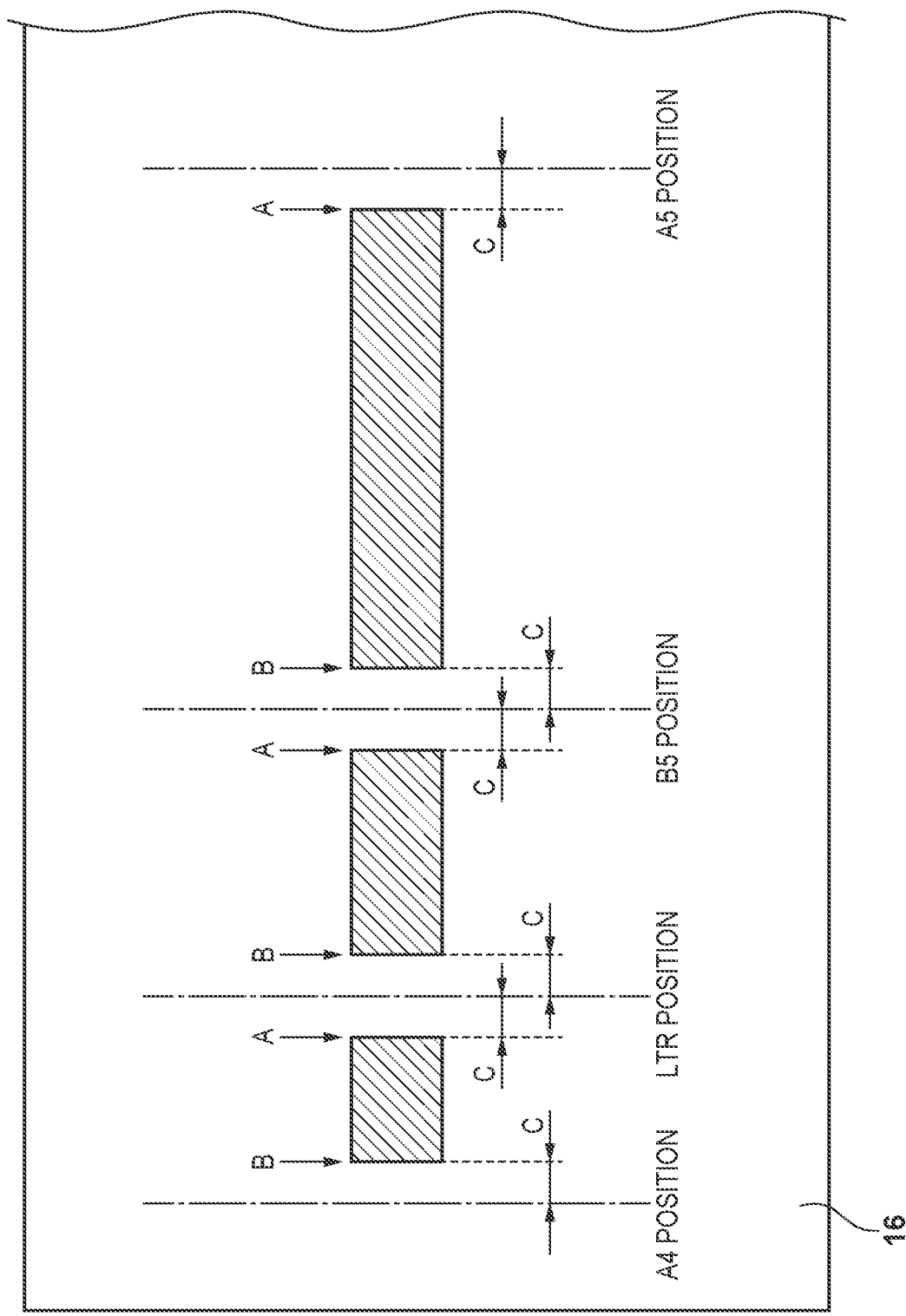

CONVEYANCE DIRECTION

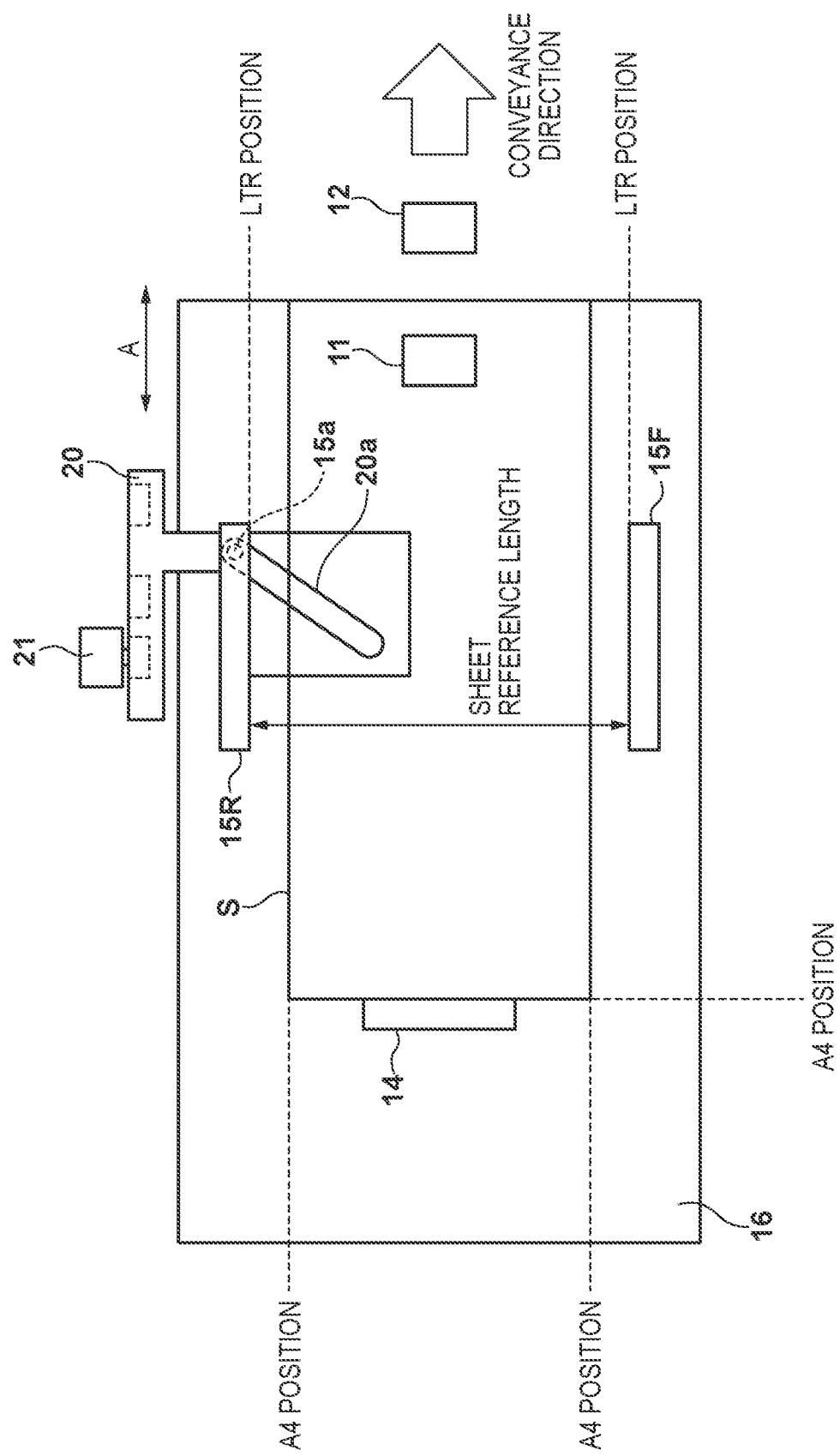

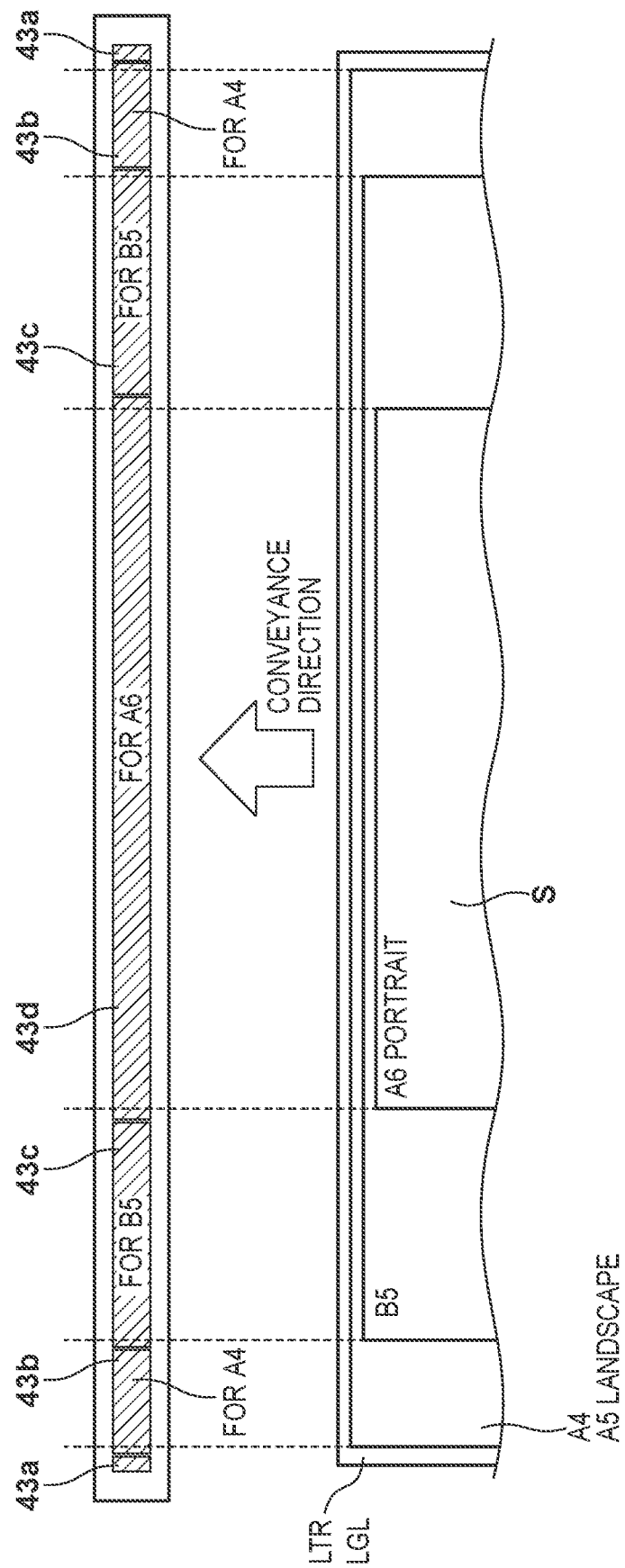

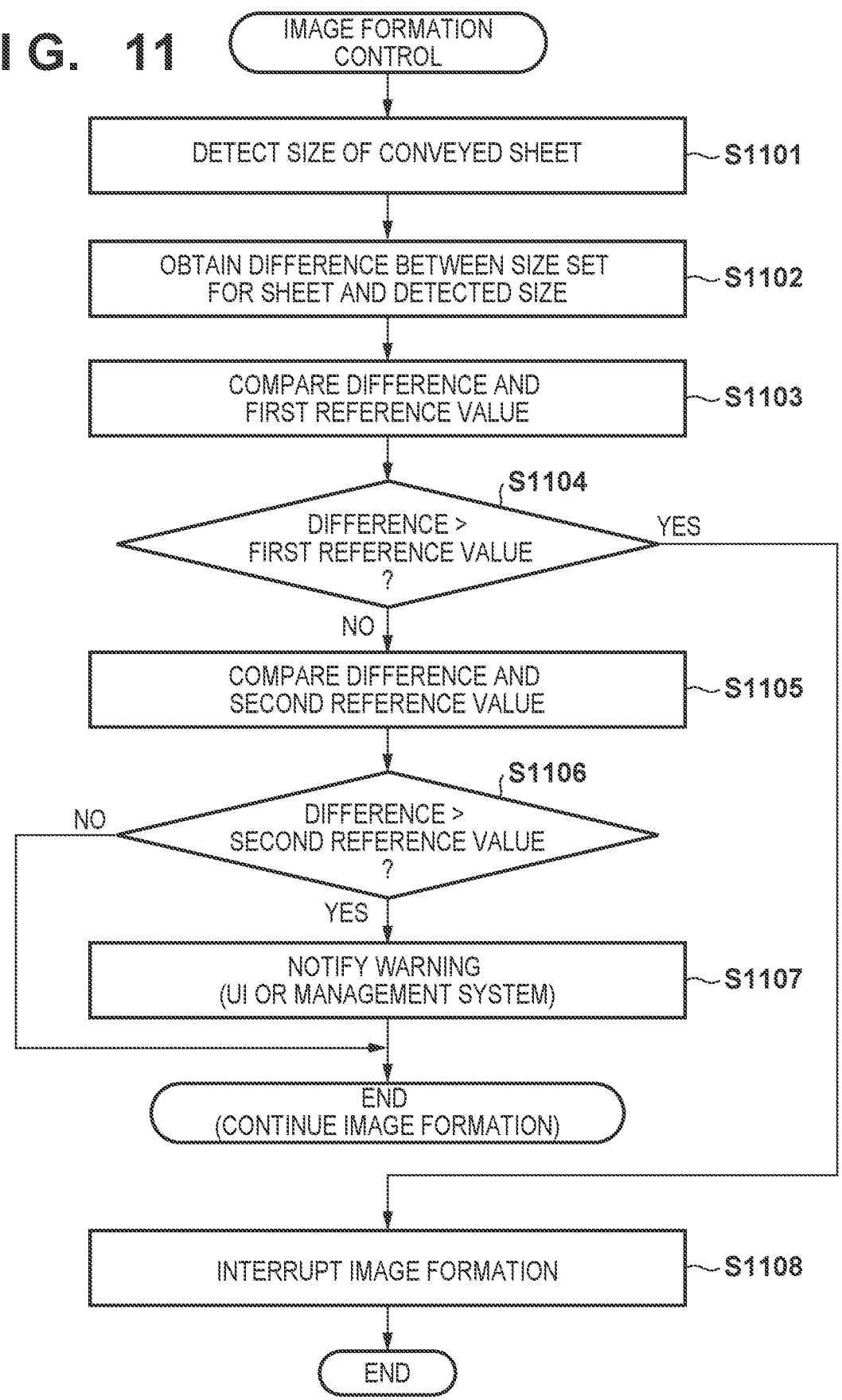

IMAGE FORMING SYSTEM AND METHOD OF CONTROLLING IMAGE FORMING SYSTEM

BACKGROUND OF THE INVENTION

Field of the Invention

The present invention relates to an image forming system and a method of controlling the image forming system.

Description of the Related Art

Some conventional image forming apparatuses execute printing after confirming that a set sheet size and an actual size match. For example, an image forming apparatus (machine) described in Japanese Patent Laid-Open No. 2014-56043 compares a sheet reference length corresponding to a position of a trailing end restriction and a size of an actually conveyed sheet by a sheet size detection unit. When a result of the comparison indicates that there is a difference of a certain amount or more, it is determined that sheet sizes do not match, a notification is made to that effect, and a print operation is temporarily interrupted. When this notification is issued, a print operation for a second sheet becomes possible by a user performing an appropriate recovery operation. Regarding specific examples of a case where the size is inappropriate, a case where the machine recognizes an A3 vertical feeding setting but in actuality A4 horizontal feeding is set, a case where a size setting of the machine does not match an actually set sheet, and the like are conceivable. Therefore, a recovery operation of Japanese Patent Laid-Open No. 2014-56043 indicates correctly resetting an end fence and a side fence after performing jam processing associated with job interruption or correctly resetting the size setting of the machine according to the actually set sheet.

In prior art, damage caused by a setting error can be prevented by interrupting printing in response to a major sheet size setting error that may lead to apparatus failure or the like. Meanwhile, however, since job interruption is an inconvenience for the user, correction is not prompted for a minor sheet size setting error that does not directly lead to apparatus failure.

Although such a minor sheet size setting error does not directly lead to an apparatus failure, when left unaddressed, it is highly likely that the error will result in a negative effect for the user, such as a paper feeding delay jam or an image defect. In addition, when such negative effects for the user occur, a person in charge of printer maintenance is contacted by the user regarding the defect, and so the minor sheet size setting error may also result in an unnecessary service response.

SUMMARY OF THE INVENTION

The present invention prevents not only a major setting error that leads to apparatus failure but also a minor setting error that does not directly lead to apparatus failure but is highly likely to result in a negative effect when left unaddressed.

The present invention for achieving the above object has the following configuration. According to an aspect of the present invention, there is provided an image forming system operable to perform image formation on a sheet, the system comprising: a storage unit for storing a sheet; a conveyance unit configured to convey a sheet along a conveyance path; a sheet size setter configured to set a size of the sheet stored in the storage unit; a sheet size detector configured to detect a size of the sheet conveyed by the conveyance unit; at least one memory that stores at least one program; and at least one processor, wherein the at least one program causes the at least one processor to perform: obtaining a difference between the size set by the sheet size setting means and the size detected by the sheet size detection means; and controlling image formation, wherein when the difference is greater than a first reference value, the processor interrupts image formation, and when the difference is less than or equal to the first reference value and greater than a second reference value, which is smaller than the first reference value, the processor notifies a warning without interrupting image formation.

As described above, by virtue of the present invention, it is possible to prevent not only a major setting error that leads to apparatus failure but also a minor setting error that does not directly lead to apparatus failure but is highly likely to result in a negative effect when left unaddressed.

Further features of the present invention will become apparent from the following description of exemplary embodiments with reference to the attached drawings.

BRIEF DESCRIPTION OF THE DRAWINGS

FIG. 3 is a cross-sectional view of a trailing end restriction size switching member according to the first embodiment.

FIG. 4 is an explanatory view illustrating a region to be determined a non-standard (outside the standard) according to the first embodiment.

FIG. 9 is a schematic top view of the storage according to a third embodiment.

FIG. 10 is a schematic view of a temperature sensor inside a fixing device according to the third embodiment.

FIG. 11 is a flowchart illustrating an operation of the image forming system according to the embodiment.

DESCRIPTION OF THE EMBODIMENTS

First Embodiment

Figure 1:
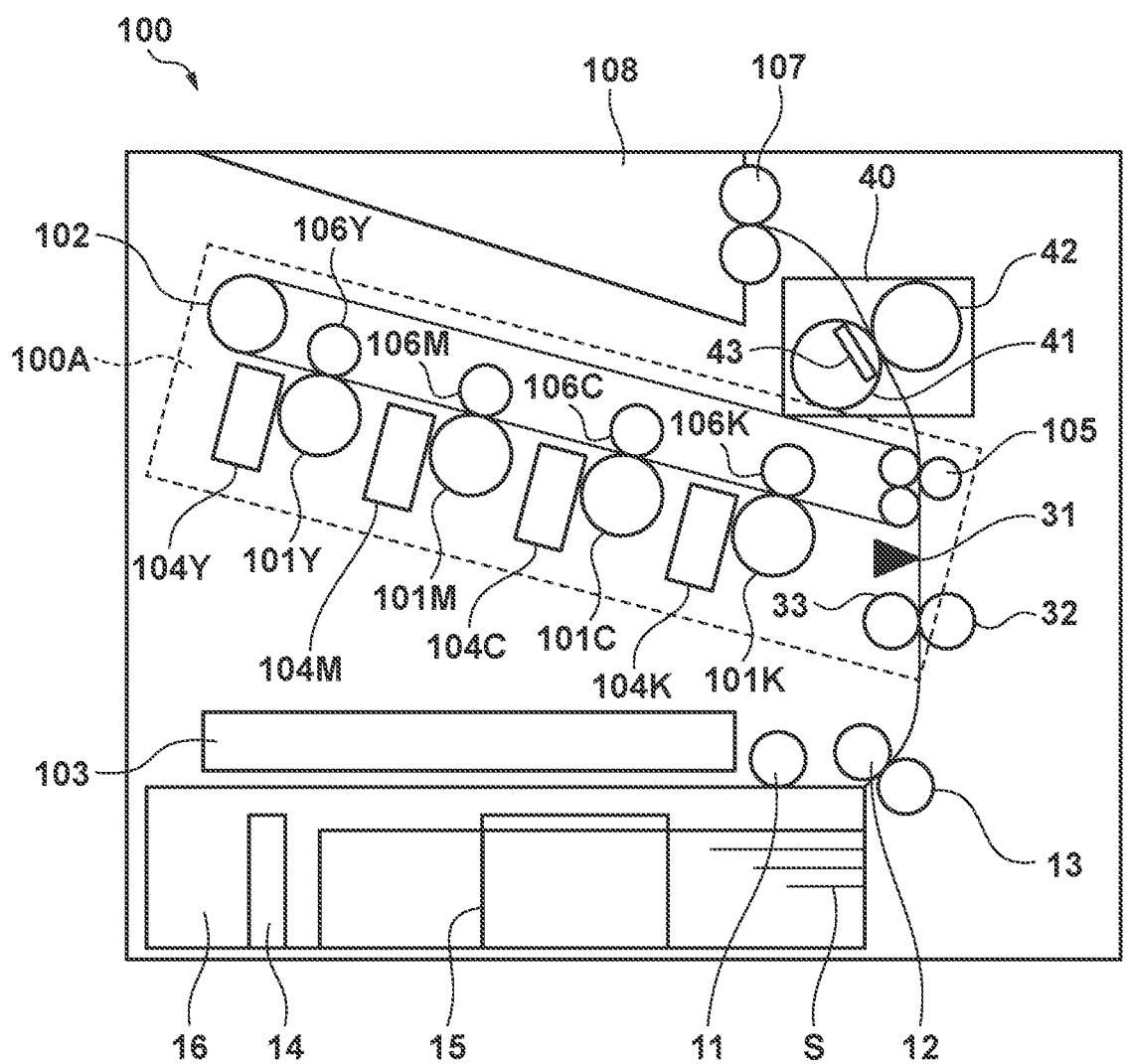
FIG. 1 is a schematic cross-sectional view illustrating an image forming apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An image forming apparatus according to the present embodiment and an external notification system that operates in communication with the image forming apparatus will be described in the following. Here, an electrophotographic color laser printer (hereinafter, LBP) will be described as an example of the image forming apparatus according to the drawings. Although the present embodiment is applied to LBP, the present invention is not limited to this. For example, the present invention can be applied so long as an apparatus includes a function for forming an image on a cut sheet, such as a copy machine. Further, the present invention may be applied to an apparatus or the like whose printing method is different, such as an inkjet printer.

Image Forming Apparatus

First, a schematic configuration of an LBP 100 as the image forming apparatus will be described with reference to FIG. 1. FIG. 1 is a schematic cross-sectional view of the LBP 100.

First, an image forming unit 100A will be described. The image forming unit 100A is provided in an apparatus main body of the LPB 100 and is an image forming unit for forming an image with an electrophotographic method. The image forming unit 100A includes four photosensitive drums 101Y, 101M, 101C, and 101K for forming toner images of four colors: yellow, magenta, cyan, and black. The toner images formed on the four photosensitive drums 101Y, 101M, 101C, and 101K are primarily transferred to an endless intermediate transfer belt 102 that is in contact with the photosensitive drums. Here, primary transfer rollers 106Y, 106M, 106C, and 106K form a nip with their respective photosensitive drums 101Y, 101M, 101C, and 101K from an inner circumference side of the intermediate transfer belt 102. The primary transfer rollers 106Y, 106M, 106C, and 106K primarily transfer the toner images by a potential difference being generated between the photosensitive drums 101Y, 101M, 101C, and 101K and the intermediate transfer belt 102. A secondary transfer roller 105 forms a nip with an outer peripheral side of the intermediate transfer belt 102 and secondarily transfers the images transferred to the intermediate transfer belt 102 onto a sheet S.

When an image forming operation is started in the image forming unit 100A, light corresponding to an image signal is emitted by the laser scanner 103 to the photosensitive drums 101Y, 101M, 101C, and 101K charged to a constant potential. Thus, electrostatic latent images are formed on the photosensitive drums 101Y, 101M, 101C, and 101K. Next, toner images (visible images) are formed on the photosensitive drums 101Y, 101M, 101C, and 101K by the latent images being developed with toner stored in developing cartridges 104Y, 104M, 104C, and 104K. The toner images formed on the photosensitive drums 101Y, 101M, 101C, and 101K are then primarily transferred to the intermediate transfer belt 102, and the toner images on the intermediate transfer belt 102 are conveyed to a secondary transfer unit by the intermediate transfer belt 102.

A sheet S is fed from a storage 16 (also referred to as a storage unit) in parallel with such a toner image forming operation. A bundle of sheets whose sizes are restricted by a trailing end restriction member 14 and a side restriction member 15 are stacked in the storage 16. The sheets S are fed from such a storage 16 one at a time by a pickup roller 11, a feed roller 12, and a separation roller 13. A sheet S is conveyed to the secondary transfer unit formed by the nip of the intermediate transfer belt 102 and the secondary transfer roller 105 by a registration roller 32 for correcting skewing and a registration roller driven roller 33. Since it is necessary to adjust a position of the sheet S in a sheet conveyance direction to that of the toner images formed on the intermediate transfer belt 102, a timing of the sheet S is adjusted by controlling a conveyance speed of the registration roller 32. The sheet S whose position has been adjusted by the registration roller 32 is conveyed to the secondary transfer unit via a conveyance sensor flag 31. The conveyance sensor flag 31 will be described later in detail with reference to FIGS. 5A to 5D. Then, the toner images are transferred from the intermediate transfer belt 102 to the sheet S by a bias being applied to the secondary transfer roller 105 in the secondary transfer unit. The sheet S to which the toner images have been transferred is then conveyed to a fixing device 40, and the toner images are fixed to the sheet S by being heated and pressed by a fixing film 41 and a fixing pressure roller 42 of the fixing device 40 at a temperature controlled using a temperature sensor 43. After the fixing, the sheet S is discharged to a catch tray 108 on an upper portion of the apparatus by a discharge roller 107.

External Notification System

Next, the image forming apparatus to which the present embodiment has been applied and the external notification system that operates in communication with the image forming apparatus will be described using FIGS. 2 to 7.

Figure 2:
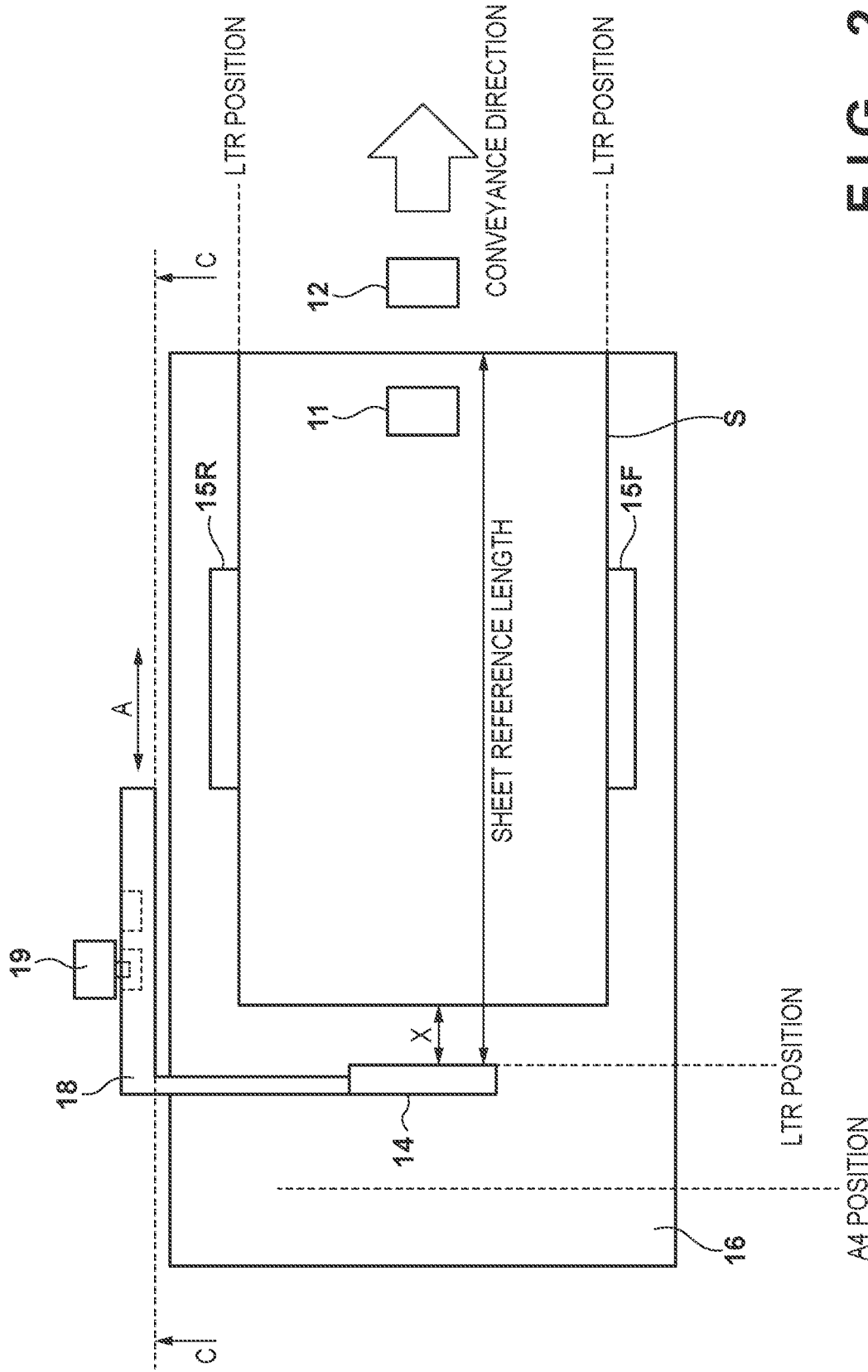
FIG. 2 is a schematic top view of a storage according to the first embodiment.

First, an overview of a configuration of the storage 16 will be described with reference to FIG. 2. FIG. 2 is a schematic top view of the storage 16. The trailing end restriction member 14 has a role of restricting a trailing end edge of the sheet S, and the side restriction member 15 has a role of restricting both side edges of the sheet S. Both the trailing end restriction member 14 and the side restriction member 15 may be plate-like members, and in that case they are also referred to as the trailing end restriction member 14 and the side restriction member 15. In the example of FIG. 2, the side restriction member 15 includes a side restriction member 15F and a side restriction member 15R along two opposite sides of the sheet. The trailing end restriction member 14 is connected to a trailing end restriction size switching member 18, and the trailing end restriction size switching member 18 is configured to be capable of moving along an A direction along the conveyance direction ii together with the trailing end restriction member 14 when the trailing end restriction member 14 is moved in the conveyance direction. A movable range of the trailing end restriction member 14 corresponds to a sheet size that can be stored in the storage 16 and is between an A5 standard length and an A4 standard length in the present embodiment. In addition, a configuration is taken such that when the trailing end restriction member 14 is at a position that is ±c mm from one of the respective standard ideal positions, the trailing end restriction member 14 is always guided to that standard ideal position, and the trailing end restriction member 14 cannot be set at a position other than a standard ideal position. The position of the trailing end restriction member 14 is detected by a trailing end restriction size reading switch 19. A configuration is taken such that when the image forming apparatus 100 starts a print operation, a pickup operation is started by the pickup roller 11 for the sheets stacked in the storage 16, and the sheets are conveyed to the feed roller 12 and then conveyed to the image forming unit.

Next, an automatic setting of a sheet length linked with the position of the trailing end restriction member 14 will be described with reference to FIGS. 3 and 4. FIG. 3 is a cross-sectional view of the trailing end restriction size switching member 18 in a C direction illustrated in FIG. 2, and FIG. 4 is an explanatory view for explaining a region in which the position of the trailing end restriction member 14 is determined to be non-standard (outside the standard).

A sheet size setting unit of the present embodiment is configured by the trailing end restriction member 14, the trailing end restriction size switching member 18, and the trailing end restriction size reading switch 19 illustrated in FIG. 2. As illustrated in FIG. 3, the trailing end restriction size switching member 18 is provided with respectively unique convex-concave patterns at positions corresponding to standard sheet lengths, such as A4 and Letter (LTR). The trailing end restriction size reading switch 19 is a triple switch configured by an upper button 19a, a middle button 19b, and a lower button 19c, and is capable of electrically detecting an on/off state of each. A standard length of the sheets stacked in the storage 16 is set in a CPU 80 (illustrated in FIG. 7) of the image forming apparatus according to a result of the trailing end restriction size reading switch 19 detecting a concave-convex pattern of the trailing end restriction size switching member 18. An LTR size is a size that is 215.9 mm×279.4 mm and is about 6 mm longer than an A4 size in a lateral direction (width) and is about 18 mm shorter in a longitudinal direction (length).

When the trailing end restriction member 14 is in each standard ideal position, the trailing end restriction size reading switch 19 reads a corresponding concave-convex pattern unique to each standard size, and when the trailing end restriction member 14 is outside of this range, the trailing end restriction size reading switch 19 reads the concave-convex pattern indicating being outside the standard. As described above, the design is such that in a region that is ±c mm from one of the respective standard ideal positions, the trailing end restriction member 14 is always guided to that standard ideal position, and when illustrated, regions in which the sheet length is determined to be non-standard (outside the standard) are regions indicated by hatching in FIG. 4. In the present embodiment, a value of c is set to 5 mm.

A state 3a of FIG. 3 illustrates a state of the trailing end restriction size reading switch 19 for when the trailing end restriction member 14 is moved to a position corresponding to the LTR size. In this state, the trailing end restriction size reading switch 19 indicates a value for the convex-concave pattern of the trailing end restriction size switching member 18 corresponding to a reference numeral 18a. In the example of the drawing, the upper button 19a and the middle button 19b are on, and the lower button 19c is off (or vice versa). A state 3b of FIG. 3 illustrates a state of the trailing end restriction size reading switch 19 for when the trailing end restriction member 14 is moved to a position corresponding to the A4 size. In this state, the trailing end restriction size reading switch 19 indicates a value for the convex-concave pattern of the trailing end restriction size switching member 18 corresponding to a reference numeral 18b. In the example of the drawing, the upper button 19a and the lower button 19c are on, and the middle button 19b is off (or vice versa). Further, for example, the trailing end restriction size reading switch 19 indicates all on (or all off) by the concave-convex patterns not being formed in regions corresponding to sheet lengths outside the standard. As described above, the trailing end restriction size reading switch 19 outputs a value unique to the set sheet size (particularly, the length along the conveyance direction), and thereby a sheet size setting can be detected. The trailing end restriction size reading switch 19 may, for example, be configured to be capable of reading out a value corresponding to each button by applying a predetermined voltage at the time of read out.

Conveyance Sensor Flag

Figure 5A:
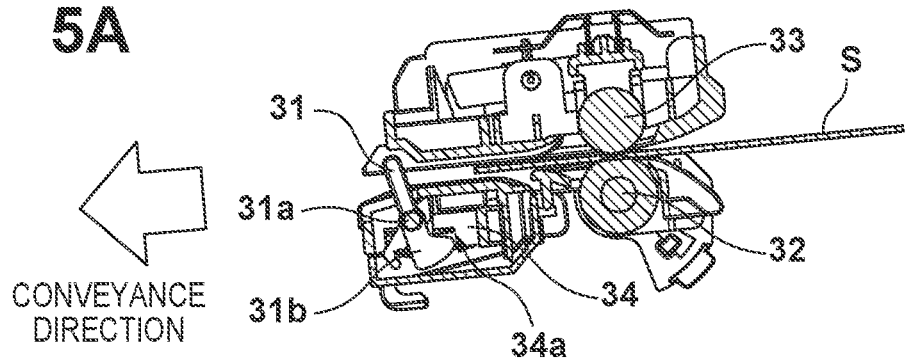
FIGS. 5A to 5D are cross-sectional operation views of a conveyance sensor flag according to the first embodiment.
Figure 5B:
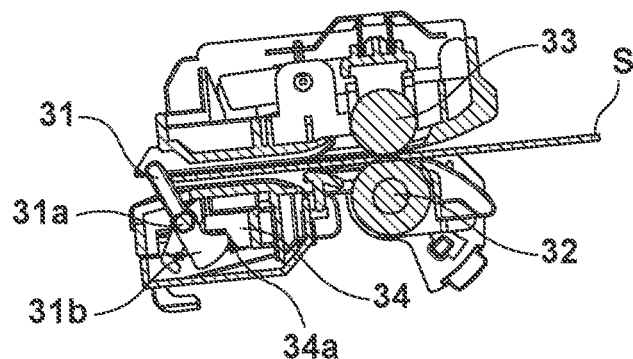
Figure 5C:
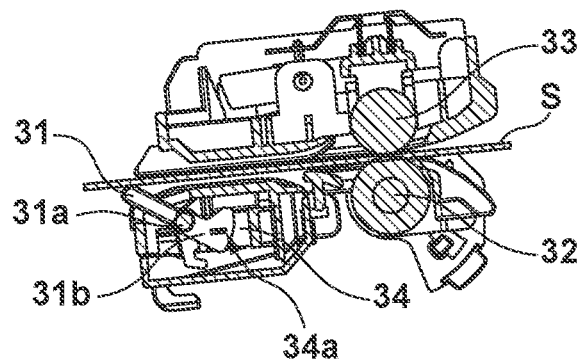

Next, an operation of the conveyance sensor flag 31, which is a flag-type conveyance sensor, arranged in a vicinity of the registration roller 32 will be described with reference to FIGS. 5A to 5D. The conveyance sensor flag 31 functions as a sheet size detection unit. FIGS. 5A to 5D are cross-sectional operation diagrams of the conveyance sensor flag 31. FIG. 5A illustrates a state immediately before a sheet meets the conveyance sensor flag 31 by being conveyed by the registration roller 32 and the registration roller driven roller 33. The conveyance sensor flag 31 is biased by a screw recoil spring (not illustrated), which is a biasing member, and is attached so as to be capable of rotating about a rotation shaft 31a. In the state of FIG. 5A, a photosensor light source unit 34a is not shielded by a light shielding portion 31b and is in a light transmitting state (or a non-light-shielded state). In this state, a photosensor detection unit (not illustrated) is irradiated by light from the photosensor light source unit 34a. When sheets are sequentially conveyed, a leading end portion of a sheet and the conveyance sensor flag 31 come into contact, and thereby, a state illustrated in FIG. 5B is entered. Thereafter, when the sheet is further conveyed for a fixed distance, the photosensor light source unit 34a becomes blocked by the light shielding portion 31b by the conveyance sensor flag 31 being pushed by the sheet and rotating about the rotation shaft 31a, and thereby a state illustrated in FIG. 5C. In this state, light from the photosensor light source unit 34a is not irradiated on the photosensor detection unit (not illustrated). Thereafter, the state illustrated in FIG. 5C in which the photosensor light source unit 34a is blocked by the conveyance sensor flag light shielding portion 31b is maintained until a trailing end of the sheet completely passes through the conveyance sensor flag 31. When the trailing end of the sheet completely passes through and leaves the conveyance sensor flag 31, the conveyance sensor flag 31 is rotated back to a state illustrated in FIG. 5D by the screw recoil spring (not illustrated), which is a biasing member. With that, the photosensor light source unit 34a returns to the light transmitting state (or the non-light-shielded state) in which it is not shielded by the light shielding portion 31b. As described above, an output signal from the photosensor detection unit of the conveyance sensor flag 31 indicates a presence of a sheet passing through the conveyance sensor flag 31. If a conveyance speed of the sheet is known, a length of the sheet in the conveyance direction can be identified from a duration in which the conveyance sensor flag 31 is detecting the passing sheet. Thus, the sheet size detection unit for detecting an actual size of a sheet is realized.

Control for Image Formation

Figure 7:
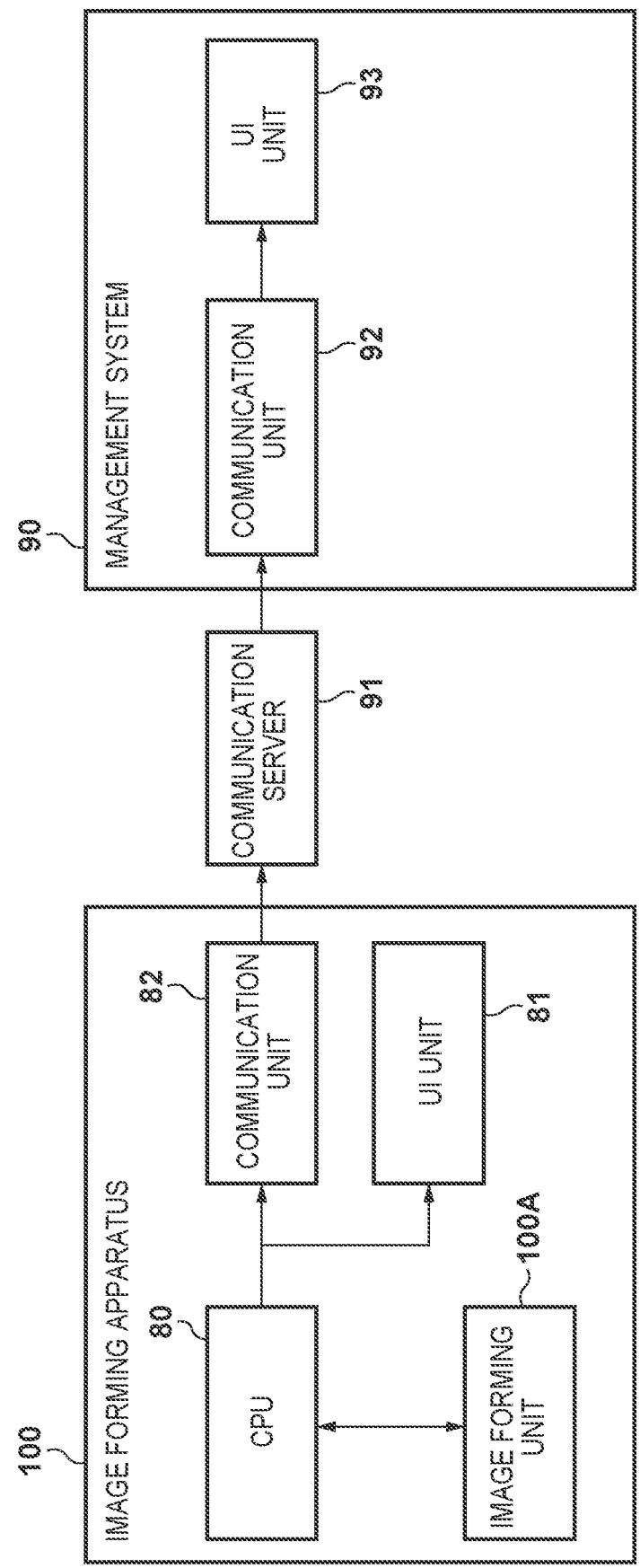
FIG. 7 is an explanatory view of a notification path according to the first embodiment.

A configuration for controlling the image forming apparatus 100 will be described with reference to an image forming system of FIG. 7. An operation of the image forming apparatus 100 is controlled by the CPU 80 functioning as a control unit thereof. The CPU 80 realizes processing according to a program stored in a memory (not illustrated) by executing the program, thereby functioning as a desired functional unit. The above-described control unit may refer to a configuration including not only the CPU 80 but also the memory storing programs and data. Although one CPU 80 is explained here, there may be a plurality of CPUs, such as a CPU (processor) for image processing and a CPU for controlling the image forming unit 100A. The CPU 80 receives signals from a detection unit (sensor) including, for example, the conveyance sensor flag 31 of the image forming unit 100A and the trailing end restriction size reading switch 19 illustrated in FIG. 1 and controls the image forming unit 100A using the signals. The control includes, for example, control of a motor, a solenoid (not illustrated), or the like for conveying a sheet and control for driving a developing drum or the transfer belt, heating a fixing unit, and the like.

Furthermore, the CPU 80 can transmit and receive information to and from a communication server 91, which is an external apparatus connected by communication by controlling a communication unit 82. The information to be transmitted may include a message addressed to an administrator, such as a person in charge of maintenance. Information for the user can be presented to the user by displaying the information on a user interface (UI) unit 81. The UI unit 81 includes a display unit and an input unit and input therefrom can be received by the CPU 80.

A management system 90 connected via the communication server 91 may be, for example, an information processing apparatus (for example, a terminal apparatus, such as a computer) used by an administrator of the image forming apparatus 100. The information processing apparatus includes a communication unit 92 for transmitting and receiving information to and from the communication server 91 and a UI unit 93 for displaying information, such as received information, and for information to be inputted by an operator. If the management system 90 is a computer, a CPU for controlling these components of the management system 90 is also provided, and various components provided in a typical computer, such as a memory and a storage, are further included. The communication server 91 is a relay server for the image forming apparatus 100 and the management system 90 and may be a so-called cloud service but may also simply be a relay apparatus or need not be present if the image forming apparatus 100 and the management system 90 are capable of direct communication.

Next, how the aforementioned sheet size mismatch jam and warning of a trailing end restriction setting error are notified will be described. In the following, a method of controlling an image forming apparatus to which the present invention is applied, specifically, a mechanism for notifying a sheet size setting error, will be described. The image forming apparatus of the present embodiment includes a unit for detecting and notifying a sheet size setting error. As illustrated in FIG. 2, an identification method will be described using as an example a case where a sheet whose length is X mm shorter than a standard LTR size has been set.

Figure 6A:
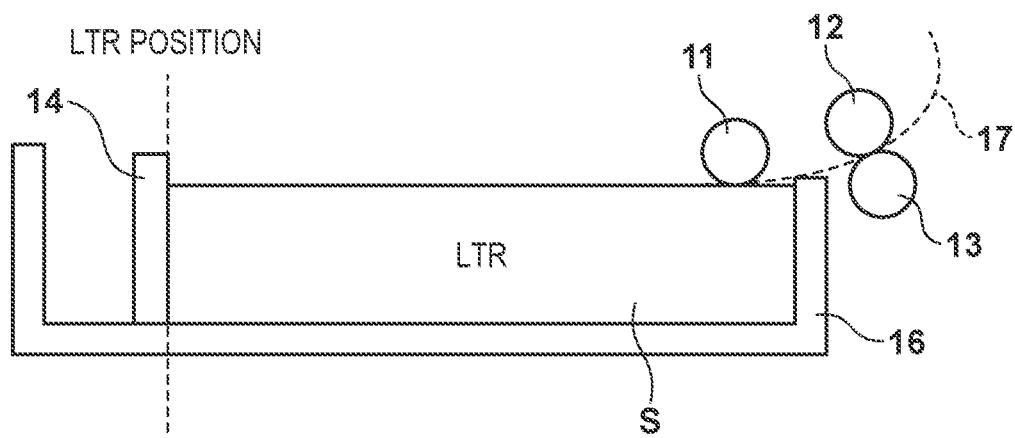
FIGS. 6A to 6C are explanatory views illustrating a relationship between a position of a trailing end restriction and an operation of the image forming apparatus according to the first embodiment.
Figure 6B:
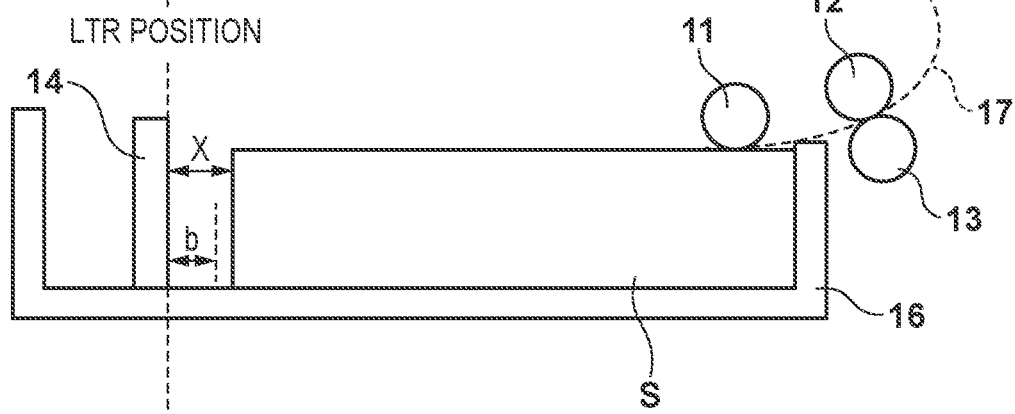
Figure 6C:
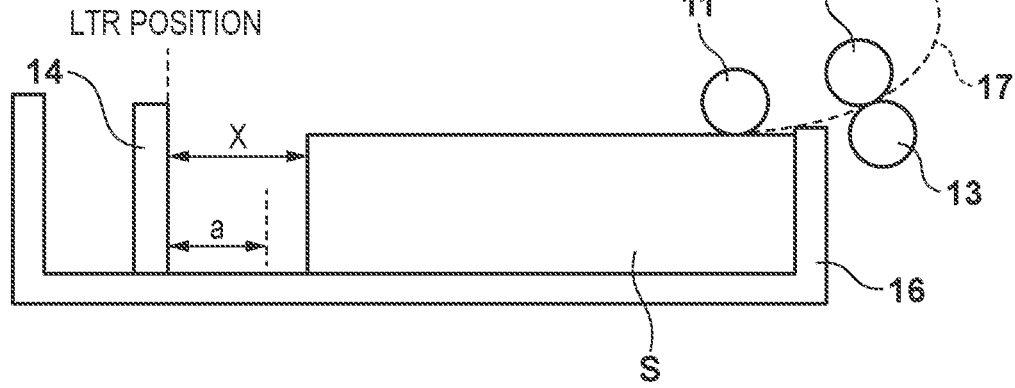

FIGS. 6A to 6C are explanatory diagrams illustrating examples of a relationship between a position of the trailing end restriction member 14 and an operation of the image forming apparatus. In all of the states in FIG. 6A to FIG. 6C, the trailing end restriction member 14 is set at an LTR length standard position. At this time, 279.4 mm, which is an LTR standard length, is set as a sheet reference length S (that is, a set size) in the CPU 80 of the image forming apparatus according to a result of the trailing end restriction size reading switch reading the concave and convex of the trailing end restriction size switching member.

Figure 5D:
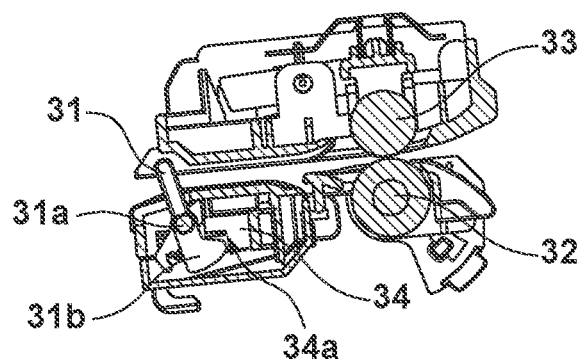

When the image forming apparatus starts a print operation and a sheet passes through the conveyance sensor flag 31 described in FIGS. 5A to 5D, an actual length of the conveyed sheet is measured. Assume that a timing of the state illustrated in FIG. 5B is t1, a timing of the state illustrated in FIG. 5D is t2, a speed at which the sheet is conveyed is a constant speed v, and a correction amount due to a difference in an on/off detection position of the sensor is d. The length of the conveyed sheet can be obtained by calculating $(t2-t1) \times v - d$. As a result of this processing, the CPU 80 of the image forming apparatus detects an actual sheet length L (that is, a detected size).

The CPU 80 of the image forming apparatus and obtains a difference X by calculating a difference between the sheet reference length S and the actual sheet length L for each sheet of the print operation. In the example of FIGS. 6A to 6C, the reference length S is set to 279.4 mm, which is a longitudinal length of the LTR size, according to a position of the trailing end restriction member 14. Therefore, the difference X is obtained as $X=L-S=L-279.4$.

Next, an operation of the image forming apparatus in which identification of a value of the difference X is a starting point will be described. The CPU 80 performs one of the following operations depending on a magnitude of the calculated difference X. First, when the difference is greater than a first reference value ($X>a$), the print job is interrupted and a sheet size mismatch jam is notified. When the difference is equal to or less than the first reference value and is greater than a second reference value ($b<X \leq a$), a warning indicating a trailing end restriction setting error is notified while the print job is continued. Here, the second reference value is smaller than the first reference value ($b<a$). The trailing end restriction setting error is information indicating that a sheet size setting is incorrect. Further, when the difference is less than or equal to the second reference value ($X \leq b$), the print job is continued and nothing is notified.

When the relationship between the position of the trailing end restriction member 14 and the sheet length is appropriate as illustrated in FIG. 6A, the difference X calculated by the CPU 80 is equal to or less than an appropriate length determination reference value b (second reference value). Therefore, when the calculation result is $b \geq X$, it is determined that the relationship between the position of the trailing end restriction member 14 and the sheet length is appropriate, and nothing is notified while the print job is continued.

When there is a small difference between the position of the trailing end restriction member 14 and the sheet length as illustrated in FIG. 6B, the difference X calculated by the CPU 80 is a value that is greater than the appropriate length determination reference value b (second reference value) and less than or equal to a failure risk reference value a (first reference value). Therefore, when the calculation result is $b<X \leq a$, it is determined that there is a risk of a future jam or an image defect even though there is no risk of apparatus failure, and so, a warning for a trailing end restriction setting error is issued while a print job is continued. The trailing end restriction setting error is a sheet size setting error, and when the sheet size is set by a method other than the trailing end restriction member 14, a setting error for that method is indicated.

When there is a large difference between the position of the trailing end restriction member 14 and the sheet length as illustrated in FIG. 6C, the difference X calculated by the CPU 80 is greater than the failure risk reference value a (first reference value). Therefore, when the calculation result is $a<X$, it is determined that there is a size setting error large enough that there is a risk of apparatus failure, and so, the print job is at least temporarily interrupted and a sheet size mismatch jam is notified. A notification for this case is performed by displaying an image in the UI unit 81 since it is desirable that a countermeasure, such as resetting a size in the image forming apparatus 100 or replacing the sheet, is immediately taken. In addition to this, information indicating jam occurrence may be transmitted to the communication server 91.

In the above description, a case where a sheet that is shorter than a standard ideal length is used has been described as an example. The present invention is not limited to this, and by applying a similar identification principle, it is possible to similarly notify a trailing end restriction setting error and a sheet size mismatch jam also for a case where a sheet is longer than the standard ideal length, that is, a case where the trailing end restriction member 14 is closed too far with respect to the sheet length.

In the present embodiment, the failure risk determination reference value a is set to 10 mm at which a risk of toner smear of the transfer unit arises, and the proper length determination reference value b is set to 3 mm at which a risk of a paper feeding delay jam begins to arise.

Next, how the aforementioned sheet size mismatch jam and warning of the trailing end restriction setting error are notified will be described with reference to FIG. 7.

When a condition for notifying a sheet size mismatch jam is satisfied, the CPU 80 interrupts the print job and displays information indicating a sheet size mismatch jam, such as a warning, on the UI unit 81 of the image forming apparatus. Meanwhile, when a condition for notifying a trailing end restriction setting error is satisfied, the print job is continued as normal; however, notification information is transmitted from the communication unit 82 in the image forming apparatus to the communication unit 92 of the management system via the external communication server 91. Then, a warning of a trailing end restriction setting error is displayed on the UI unit 93 of the management system 90. The administrator who is managing the image forming apparatus 100 performs a countermeasure for improvement, such as prompting the user to correctly set the trailing end restriction member 14, prompted by the warning.

As described above, a response operation in a case where a set sheet size and a detected sheet size are different is performed in two stages according to the degree of the difference. By doing so, it is possible to prevent in advance both a risk that may lead to apparatus failure and a risk that may lead to user inconvenience, such as a jam or an image defect.

In the above-described embodiment, a configuration in which determination in which a calculation result of the difference X is used is performed each time one sheet is conveyed has been described; however, the present invention is not limited to the configuration in which the determination is performed for each sheet by the CPU of the image forming apparatus. For example, in a case where a variability in detection of the actual sheet length by the conveyance sensor flag 31 is expected, it is possible to increase the detection reliability by statistically processing calculation results of a plurality of sheets.

The determination need not be performed by the image forming apparatus 100 but by the communication server 91 or the like external to the image forming apparatus. By performing processing on the server, it becomes possible to perform more advanced statistical processing.

Further, in the present embodiment, a target to be notified of an error in a setting for the trailing end restriction member 14 is assumed to be an administrator of a printer, and the display is performed by the display unit 93 of the management system 90; however, the display may be performed on the UI unit 81 of the image forming apparatus with an end user as the target to be notified.

Furthermore, although an actual length of a conveyed sheet is detected using the flag-type conveyance sensor flag 31 in the present embodiment, the present invention is not limited to this. For example, a transmissive sensor including a light source and a photosensor arranged opposing each other via a conveyed sheet may be used. Alternatively, a reflective optical sensor for detecting, by a photosensor, light from a light source reflected by a sheet may be used. Also, a mechanical sensor, such as a microswitch, may be used in place of an optical sensor. The mechanical sensor may be used in place of, for example, an optical sensor combined with the conveyance sensor flag 31.

Furthermore, although a configuration in which the trailing end restriction member 14, the trailing end restriction size switching member 18, and the triple trailing end restriction size reading switch 19 are used as the sheet size setting unit has been illustrated in the present embodiment; however, another configuration may be used. For example, as illustrated in FIG. 9, a side restriction size switching member 20 linked with the side restrictions 15F and 15R for restricting positions in a sheet width direction and a side restriction size reading switch 21 may also be provided. In this configuration, a sheet size is set by combining output results of the trailing end restriction size reading switch 19 and the side restriction size reading switch 21. Although a configuration illustrated in FIG. 9 will be described in detail in a third embodiment, in principle, the configuration is similar to the mechanism for setting a size according to the position of the trailing end restriction member 14 illustrated in FIG. 2. In FIG. 9, a difference from the mechanism of FIG. 2 is that a sliding mechanism for converting movement of the side restriction member 15 into movement in a direction perpendicular thereto is provided. By utilizing this configuration, the total number of switches required for setting a size can be reduced. In this case, a mechanism for detecting a width of a sheet to be conveyed is necessary, and for that purpose, an optical sensor or a mechanical sensor, for example, may be provided in the conveyance path or the storage 16 and the width may be detected by that.

Further, a slide volume for changing an electrical resistance value in coordination with the positions of the trailing end restriction member 14 and the side restrictions 15F and 15R may be used instead of a switch. Furthermore, a configuration in which the user manually sets the sheet size on an operation panel of the image forming apparatus or a printer driver of a computer may be taken in place of the configuration in which the sheet size is automatically set.

As described above, for a major sheet size setting error, apparatus failure is prevented in advance by an avoidance operation according to interruption of the print job. Meanwhile, for a minor sheet size setting error, it is possible to prompt a corrective response by notifying a user or a person in charge of maintenance, such as a dealer responsible for maintenance management, that a setting error has occurred, while allowing printing. Even when trouble such as a conveyance jam occurs at a user location when a person in charge of maintenance is in a remote location, it is possible to improve the situation by a remote response even if the person in charge of maintenance does not visit the user location, since it can be recognized that the cause is a sheet size setting error.

The above-described effect allows advanced prevention measures to be taken against problems that may arise due to a sheet size setting error.

Second Embodiment

In the first embodiment, a method of detecting a setting error for when the trailing end restriction member 14 is set at a standard position in a situation in which a sheet whose length is non-standard is stored in the storage 16 has been described. In a second embodiment, a case to be applied for when the trailing end restriction member 14 is set at a position outside of the standard in a situation in which a sheet whose length is standard is stored in the storage 16 will be described. For parts overlapping with the description of the above-described embodiment, the same reference numerals will be assigned and description will be omitted.

Figure 8A:
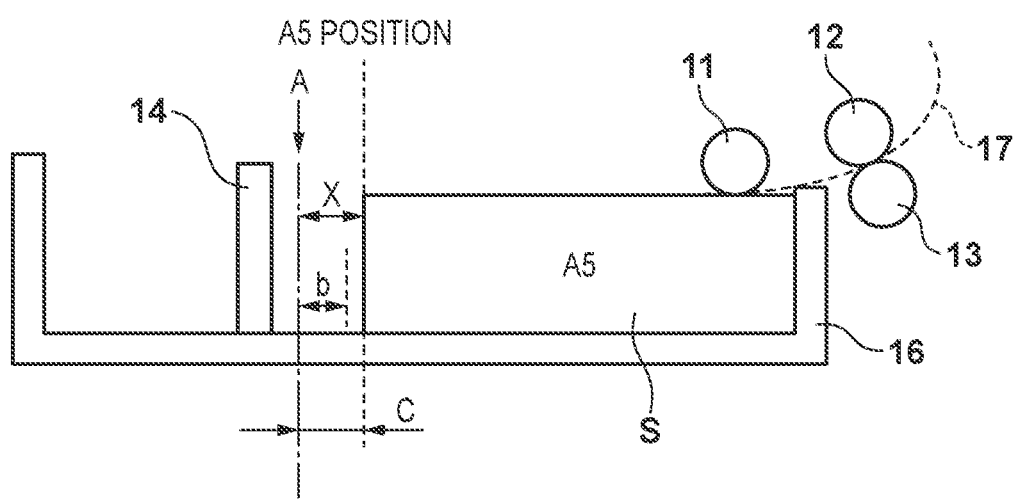
FIGS. 8A and 8B are explanatory views illustrating a relationship between a position of the trailing end restriction and an operation of the image forming apparatus according to a second embodiment.

As described in the first embodiment, a configuration is taken such that when the position of the trailing end restriction member 14 is c or more mm away from each standard ideal position, the trailing end restriction size reading switch 19 reads a concave-convex pattern indicating that the trailing end restriction member 14 is outside the standard. Therefore, in a case where the trailing end restriction member 14 is located outside a range of the standard as illustrated in FIG. 8A, the CPU 80 can detect that the trailing end restriction member 14 is in a position of a non-standard length but cannot identify what that length is. Therefore, after the actual sheet length (i.e., the detected size) detected by the sheet size detection unit is referenced, the nearest standard ideal length±c mm (5 mm in the present embodiment) is set as the sheet reference length (i.e., the set size). That is, a value corresponding to an A or B position illustrated in FIG. 4 is a value that may be a candidate for the sheet reference length. A is a sheet reference length in a direction in which the trailing end restriction member 14 has been opened too far for each standard size, and B is a sheet reference length in a direction in which the trailing end restriction member 14 has been closed too far for each standard size.

Hereinafter, a description will be given through a specific example, and a flow of processing thereof will be described with reference to FIGS. 8A and 8B. In the present embodiment, a flow leading to determination of a setting error in a direction in which the trailing end restriction member 14 has been opened too far will be described.

Figure 8B:
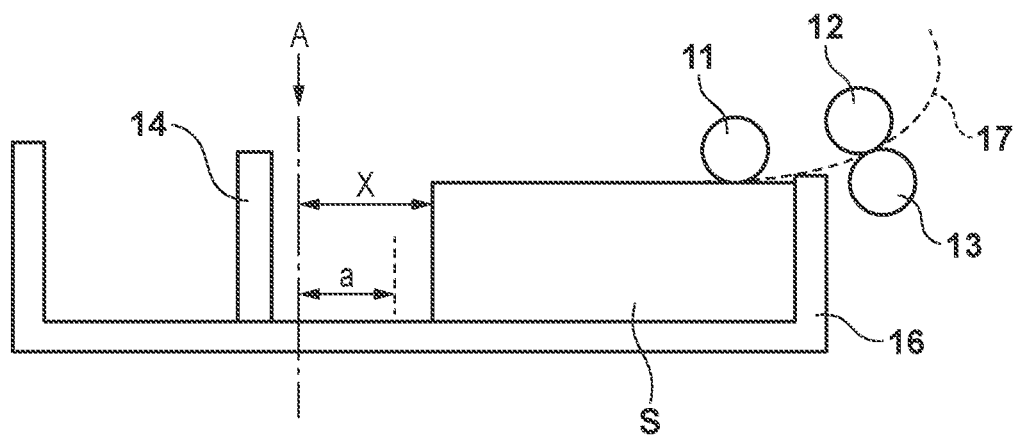

FIGS. 8A and 8B are explanatory diagrams illustrating a relationship between a position of the trailing end restriction member 14 and an operation of the image forming apparatus. In the example illustrated in FIG. 8A, A5-sized sheets are stacked, and in the example illustrated in FIG. 8B, sheets that are shorter than the A5 size in the conveyance direction are stacked, and the trailing end restriction member 14 is set at a position determined to be non-standard (outside the standard).

At this time, when an actual length of a fed sheet is detected by the conveyance sensor flag 31, which is the sheet size detection unit, the CPU 80 determines whether the length is equal to or less than +1.5 mm of any of the standard sizes. "+1.5 mm" is a tolerance applied to standard size determination in the present embodiment in view of the sheet length detection accuracy of the conveyance sensor flag 31. When the detected sheet length is within this range, it is determined that the sheet being fed is the standard size. The standard size to be determined is a size that can be stored in the storage 16. For example, if A4 portrait, A5 portrait, A5 landscape, and LTR can be stored, the set size is each of their lengths in the conveyance direction, and lengths in an A4 longitudinal direction, an A5 longitudinal direction, an A5 lateral direction, and an LTR longitudinal direction will be candidates for the standard size. A configuration is taken such that the standard sizes to be candidates are stored in advance in a non-volatile memory (not illustrated) or the like and are accessible from the CPU 80. Then, if a difference between these lengths to be candidates and the detected size is within a range of the tolerance when they are compared, the corresponding candidate is identified.

In cases illustrated in FIGS. 8A and 8B, it is determined that the target sheet is the A5 size. In the above example, since the A5 size can be stacked both vertically and horizontally, the detected size may correspond to either the vertical or horizontal dimension of the A5 size, and so, in that case, the detected size may be identified including for which side it is. Of course, not only that the detected size is the A5 size but also the dimensions themselves may be stored.

Then, the sheet size setting unit in which the length being outside the standard has been temporarily set references the determination result and sets the identified length, such as 215 mm which is the A5 longitudinal length+c mm (5 mm in the present embodiment), as the sheet reference length.

Thereafter, similarly to the first embodiment, an operation of the image forming apparatus is selected according to the magnitude of the difference X between the actual sheet length and the sheet reference length. For example, in the case illustrated in FIG. 8A, b<X≤a, and so a warning of a trailing end restriction setting error is issued. For example, in the case illustrated in FIG. 8B, a<X, and so the print job is interrupted and a sheet size mismatch jam is notified.

When the sheet size detection unit according to the trailing end restriction member 14 performs resistance value detection of a variable resistance element instead of the above-described size recognition method, the position of the trailing end restriction member 14 can be linearly detected. Thus, regardless of whether the position of the trailing end restriction member 14 is in a standard position or in a non-standard position, it is possible to perform two-stage detection and notification of an error in the setting for the trailing end restriction member 14 and a sheet size mismatch jam at any position. In addition, similarly to the first embodiment, the above embodiment may be applied to the side restriction member 15 instead of the trailing end restriction member 14.

Third Embodiment

Although the first and second embodiments notify a trailing end restriction setting error, the present invention is not limited to notification of an error in a setting for a length of a sheet in the conveyance direction. This has been described briefly in the first and second embodiments; however, in the present embodiment, a configuration for notifying a side restriction setting error will be described in more detail with reference to FIGS. 9 and 10. The image forming apparatus of the present embodiment has similar configurations as those of the first and second embodiments except for configurations illustrated in FIGS. 9 and 10.

First, an overview of a configuration of the storage 16 will be described with reference to FIG. 9. Similarly to the trailing end restriction size switching member 18, the side restriction size switching member 20 is provided with a plurality of convex-concave patterns according to each sheet size, such as for A4 and LTR. The size here is a size in a width direction perpendicular to the conveyance direction. A movable range of the side restriction member 15 corresponds to a sheet size that can be stored in the storage 16 and is between an A6 standard length and an LGL/LTR standard length in a sheet width direction in the present embodiment. LGL is a legal size and a lateral length is 215.9×355.6 mm and is the same as the LTR size.

The side restriction size reading switch 21 is configured by a triple switch similarly to the trailing end restriction size reading switch 19. A side restriction member 15a is provided on the side restriction member 15R, and the side restriction member 15a and a hole 20a of the side restriction size switching member are engaged. When a movement operation is performed in the sheet width direction on the side restriction member 15F and the side restriction member 15R in order to restrict both side edges of a sheet in coordination, the side restriction size switching member 20 slides along the hole 20a and moves in an A direction perpendicular to the movement of the side restriction member 15. A position of the side restriction member 15R in the conveyance direction after the movement will be a position corresponding to a position in the width direction. The side restriction size reading switch 21 recognizes a size of both ends of the sheets stacked in the storage 16 by reading a concave-convex pattern of the side restriction size switching member 20 corresponding to a size of both ends of each sheet.

The above configuration constitutes a unit for detecting a sheet size in the width direction. The side restrictions 15R and 15F may be configured to move opposing each other in the width direction by, for example, a linking mechanism or the like. Further, the side restriction size switching member 20 may be configured not to change in the position in the width direction and move only in the position in the conveyance direction. Alternatively, the side restriction size reading switch 21 may be configured to move only in the width direction according to the movement in the width direction of the side restriction member 15R and not change in the position in the conveyance direction. In either case, a configuration in which a positional relationship between the side restriction size switching member 20 and the side restriction size reading switch 21 does not change in the width direction and changes only in the conveyance direction according to the movement of the side restriction member 15R in the width direction.

The sheet reference length in the sheet width direction is defined using the side restriction member 15, the side restriction size switching member 20, and the side restriction size reading switch 21. When the position of the side restriction member 15 is not in a position of a standard, such as A4, a result detected by the side restriction size reading switch 21 is a common non-standard determination pattern; however, in this case, the sheet reference length in the sheet width direction is defined in a sequence similar to the second embodiment.

Next, a temperature sensor 43, which is a sheet size detection unit in the sheet width direction, will be described with reference to FIG. 10. FIG. 10 is a schematic view of the temperature sensor 43 inside the fixing device 40.

The temperature sensor 43 is divided into an LTR/LGL temperature sensor 43a, an A4 temperature sensor 43b, a B5 temperature sensor 43c, and an A6 temperature sensor 43d, and these are arranged symmetrically from a center line of a width of a sheet to be conveyed except for the A6 temperature sensor 43d. End positions of each of the divided temperature sensors are arranged so as to be extended to the outside of positions slightly farther than the end positions of each of the sheets to be conveyed. A signal value of the temperature sensor 43 is accessible by the CPU 80 and a temperature can be detected with that value. A width of a sheet can be estimated from a temperature distribution according to each size. In FIG. 10, an upward direction is the conveyance direction, and the width is a direction perpendicular to the conveyance direction.

More specifically, an actual length of a sheet in the width direction is detected by each of the divided temperature sensors. When image forming processing advances, and a sheet to which toner images have been transferred is conveyed to the fixing device 40, the toner images are fixed onto the sheet by the fixing device 40 performing heating and pressing. In a region of a sheet passing portion of the temperature sensor 43 included in the fixing device 40, heat is stolen by the fed sheet, and so a rise in temperature is suppressed; however, in a region of a non-sheet passing portion, heat accumulates, and so the temperature is higher than the region of the sheet passing portion. By detecting this rise in temperature in the region of the non-sheet passing portion, it is possible to detect the actual length of the fed sheet in the width direction.

For example, if the temperature detected by the A5 temperature sensor 43c is higher than the temperature detected by the A6 temperature sensor 43d, it can be determined that the sheet width is an A6 size. For example, if the temperature detected by the A4 temperature sensor 43b is higher than the temperature detected by the A5 temperature sensor 43c, it can be determined that the sheet width is the A5 size. Assume that the sheet width indicates a length of a sheet size in the lateral direction. Thus, the sheet width is detected based on the distribution of temperatures detected by the temperature sensor.

Thereafter, similarly to the first embodiment, the difference X between the actual length of the sheet in the width direction thus detected and the sheet reference length in the width direction is calculated, and when $b<X \leq a$, a side restriction setting error is determined, and when $a<X$, a sheet size mismatch jam is determined. When $b \geq X$, nothing is notified.

As described above, even when a side restriction setting error is notified, it is possible to obtain the effect similar to the first embodiment.

A unit for detecting an actual length of a sheet in the width direction need not be the temperature sensor 43 and, for example, may be a flag-type width sensor arranged in a direction perpendicular to the sheet conveyance direction. In that case, it is assumed that a position at which the flag-type width sensor is arranged is on an outer side in the width direction of a sheet to be detected. In addition, a unit for measuring the length of the sheet in the width direction, for example, may be arranged in the sheet width direction and may be a line sensor for detecting edges in the width direction.

Configuration Described in Embodiments

FIG. 11 illustrates a sequence common to the above-described embodiments. The entire sequence of FIG. 11 may be performed by the image forming apparatus 100 or a portion related to the user interface, such as a warning notification may be performed by the management system, and the remaining may be performed by the image forming apparatus 100.

In FIG. 11, the image forming apparatus 100 detects a size of a sheet being conveyed (step S1101). Then, a difference between a separately set sheet setting size and a detected size detected in step S1101 is obtained by calculation or the like (step S1102). Then, the obtained difference and a separately set first reference value are compared (step S1103). The first reference value may be the first reference value a described in the first embodiment.

When it is determined that the difference is greater than the first reference value (Yes in step S1104), image formation is interrupted (step S1108). At this time, the user may be notified that image formation has been interrupted. When it is determined that the difference is less than or equal to the first reference value (No in step S1104), the difference and a separately set second reference value are compared (step S1105). The second reference value is smaller than the first reference value and may be the second reference value b described in the first embodiment.

When it is determined that the difference is greater than the second reference value (Yes in step S1106), that is, when the difference is less than or equal to the first reference value and greater than the second reference value, something to that effect is notified (step S1107). At this time, image formation is continued without interruption. When it is determined that the difference is less than equal to the second reference value (No in step S1106), the image forming processing continues as is. A warning in step S1107 may be outputted to the user interface of the image forming apparatus 100 with an image, audio, or the like or may be outputted remotely to the management system. In the latter case, the management system outputs the warning to the user via its user interface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091825, filed Jun. 6, 2022, which is hereby incorporated by reference herein in its entirety.

What is claimed is:

1. An image forming system operable to perform image formation on a sheet, the system comprising:
a storage for storing a sheet;
a conveyor configured to convey a sheet along a conveyance path
a sheet size setter configured to set a size of the sheet stored in the storage;
a sheet size detector configured to detect a size of the sheet conveyed by the conveyor;
at least one memory that stores at least one program; and
at least one processor, wherein the at least one program causes the at least one processor to perform:
obtaining a difference between the size set by the sheet size setter and the size detected by the sheet size detector; and
controlling image formation, wherein
when the difference is greater than a first reference value, the processor interrupts image formation, and when the difference is less than or equal to the first reference value and greater than a second reference value, which is smaller than the first reference value, the processor notifies a warning without interrupting image formation.

2. The image forming system according to claim 1, wherein
the set size and the detected size are lengths of a sheet in a conveyance direction.

3. The image forming system according to claim 2, wherein
the sheet size detector detects a length of a sheet in the conveyance direction by detecting that sheet conveyed by the conveyor.

4. The image forming system according to claim 3, wherein
the sheet size detector includes a flag-type conveyance sensor configured to detect the sheet conveyed by the conveyor.

5. The image forming system according to claim 3, wherein
the sheet size detector includes an optical sensor configured to detect the sheet conveyed by the conveyor.

6. The image forming system according to claim 1, wherein
the set size and the detected size are lengths of a sheet in a width direction perpendicular to a conveyance direction.

7. The image forming system according to claim 6, wherein
the sheet size detector includes a flag-type width sensor arranged in the width direction of a sheet to be detected.

8. The image forming system according to claim 6, wherein
the sheet size detector includes a temperature sensor arranged in the width direction of a sheet to be detected.

9. The image forming system according to claim 6, wherein
the sheet size detector includes a line sensor arranged in the width direction of a sheet to be detected.

10. The image forming system according to claim 1, wherein
the image forming system includes an image forming apparatus including a user interface, and
the warning outputted by the processor is presented to a user by the user interface.

11. The image forming system according to claim 1, wherein
the sheet size setter includes a restriction member arranged in the storage and a detector which detects a position of the restriction member, and
the set size is a size according to the position detected by the detector.

12. The image forming system according to claim 1, wherein
the sheet size setter sets a size inputted by a user as the set size.

13. The image forming system according to claim 1, wherein the sheet size setter stores a plurality of sheet size candidates, and sets a size based on a sheet size selected from among the candidates based on the size detected by the sheet size detector.

14. The image forming system according to claim 1, further comprising:

an image forming apparatus including the controller; and an external apparatus connected to the image forming apparatus by a communication, wherein the warning outputted by the processor is transmitted to the external apparatus by the communication.

15. A method of controlling an image forming system operable to perform image formation on a sheet, the image forming system comprising:

a storage configured to store a sheet;

a conveyor configured to convey a sheet along a conveyance path;

a sheet size setter configured to set a size of the sheet stored in the storage; and a sheet size detector configured to detect a size of the sheet conveyed by the conveyor, and the method comprising:

obtaining a difference between the size set by the sheet size setter and the size detected by the sheet size detector; and when the difference is greater than a first reference value, interrupting image formation; and when the difference is less than or equal to the first reference value and greater than a second reference value, which is smaller than the first reference value, notifying a warning without interrupting image formation.

* * * * *